Nov. 5, 1963 P. B. KAHN ETAL 3,109,318
CONTROL DEVICES
Filed Dec. 16, 1960 5 Sheets-Sheet 5

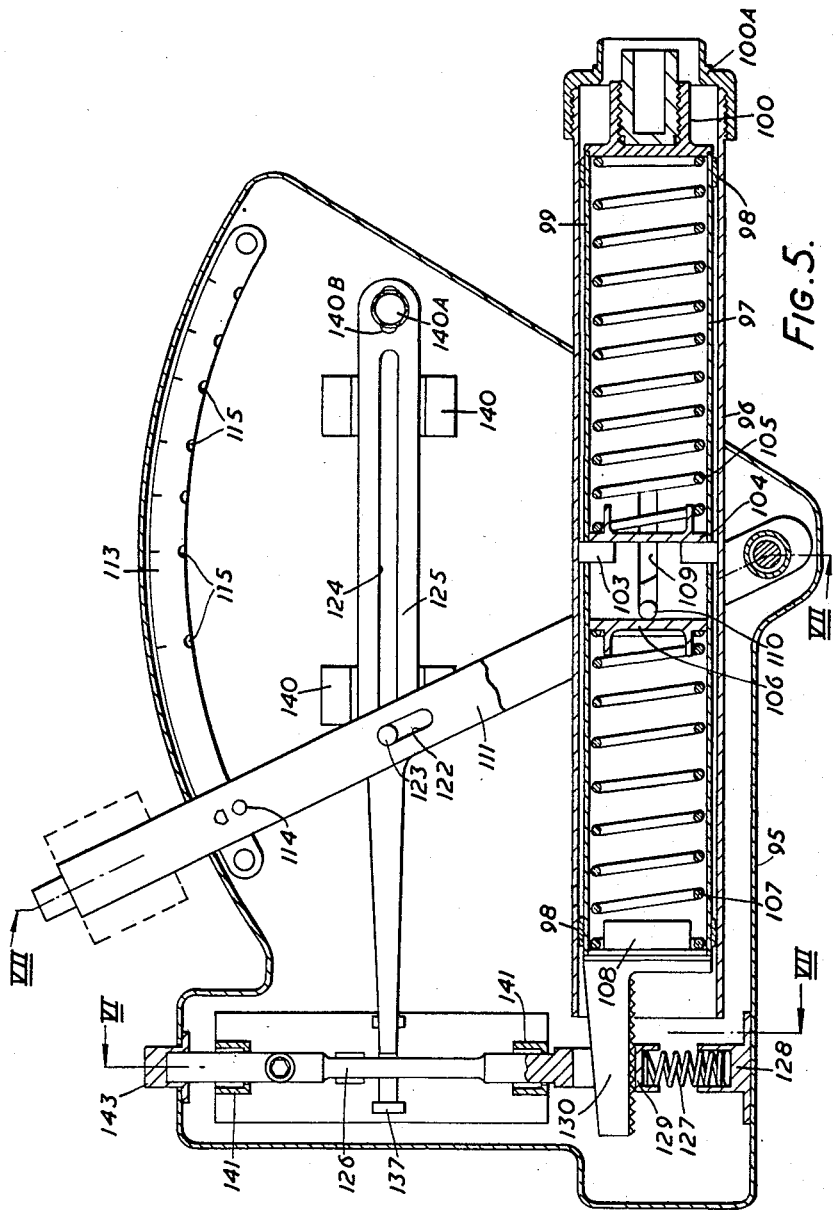

United States Patent Office 3,109,318
Patented Nov. 5, 1963

3,109,318
CONTROL DEVICES
Peter Bruno Kahn, Loughton, and Norman Frederick North, North Romford, England, assignors to The Plessey Company Limited, London, England, a British company
Filed Dec. 16, 1960, Ser. No. 76,345
Claims priority, application Great Britain Dec. 23, 1959
10 Claims. (Cl. 74—470)

This invention relates to a control device and is more particularly, but not exclusively, concerned with a control unit for installation in cockpits of an aircraft of the kind commonly known as vertical take-off aircraft. The control device with which this application is concerned is intended to be used in conjunction with apparatus which is used to rotate the jet nozzles of jet engines of such aircraft between a position in which vertical take-off or landing conditions are fulfilled and horizontal flight conditions.

It is an object of the present invention to provide a control device which enables a pilot to pre-select a desired nozzle angle by pre-setting a stop mechanism provided on the device and by moving a control lever to the stop mechanism when it is in fact desired to actuate the apparatus which is under the control of the control device.

It is a further object of the present invention to provide a control device incorporating means for indicating the state or setting at any instant during the operation thereof, of the apparatus which is being controlled by the control device.

It is a further object of the present invention to provide in the control device means for manually over-riding the normal operation of the device.

It is a further object of the present invention to provide a control unit which permits a particular desired jet angle setting to be pre-selected by the pilot thereby enabling the pilot to operate the control unit, so that the latter carries out the predetermined operation at a convenient time by the mere striking of a control button or the like.

Broadly, in accordance with the present invention, the control device includes a manually actuatable control element which is arranged to vary the stored energy of a pre-loaded resilient member by an amount which is related to the amount of movement of the control element, and wherein the resilient member is connected to move an element to be controlled, the connection being such that the element to be controlled is moved by an amount which is proportional to the variation of the stored energy of the resilient member.

In an embodiment of a control unit, a manual control lever is arranged to compress a pre-loaded spring by an additional amount related to the amount of displacement of the lever, and wherein a catch mechanism is arranged to lock the spring in the final compressed condition until the unit is required to effect a control action. The spring pre-load ensures that full operating force is available up to the stop.

For a better understanding of the invention one construction thereof will be described in greater detail in relation to FIGURES 1 to 4 of the drawings and FIGURES 5, 6 and 7 of the accompanying drawings illustrate a second embodiment of the control device, in which:

FIGURE 4 is a section on the line IV—IV of FIGURE 3,

FIGURE 5 is a section on the line V—V of FIGURE 1, and illustrates a second embodiment of the control unit.

Figure 1:
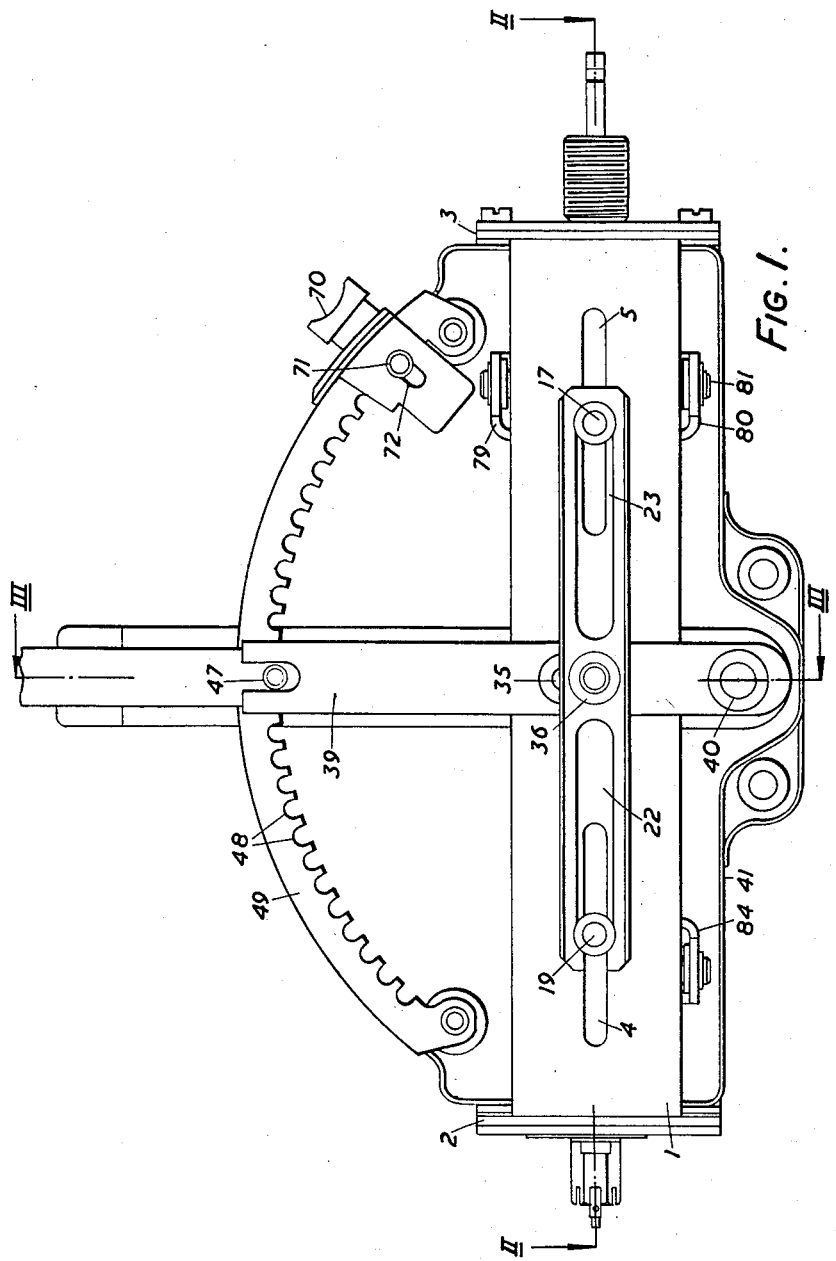
FIGURE 1 is a side elevation of a first embodiment of the control device.
Figure 2:
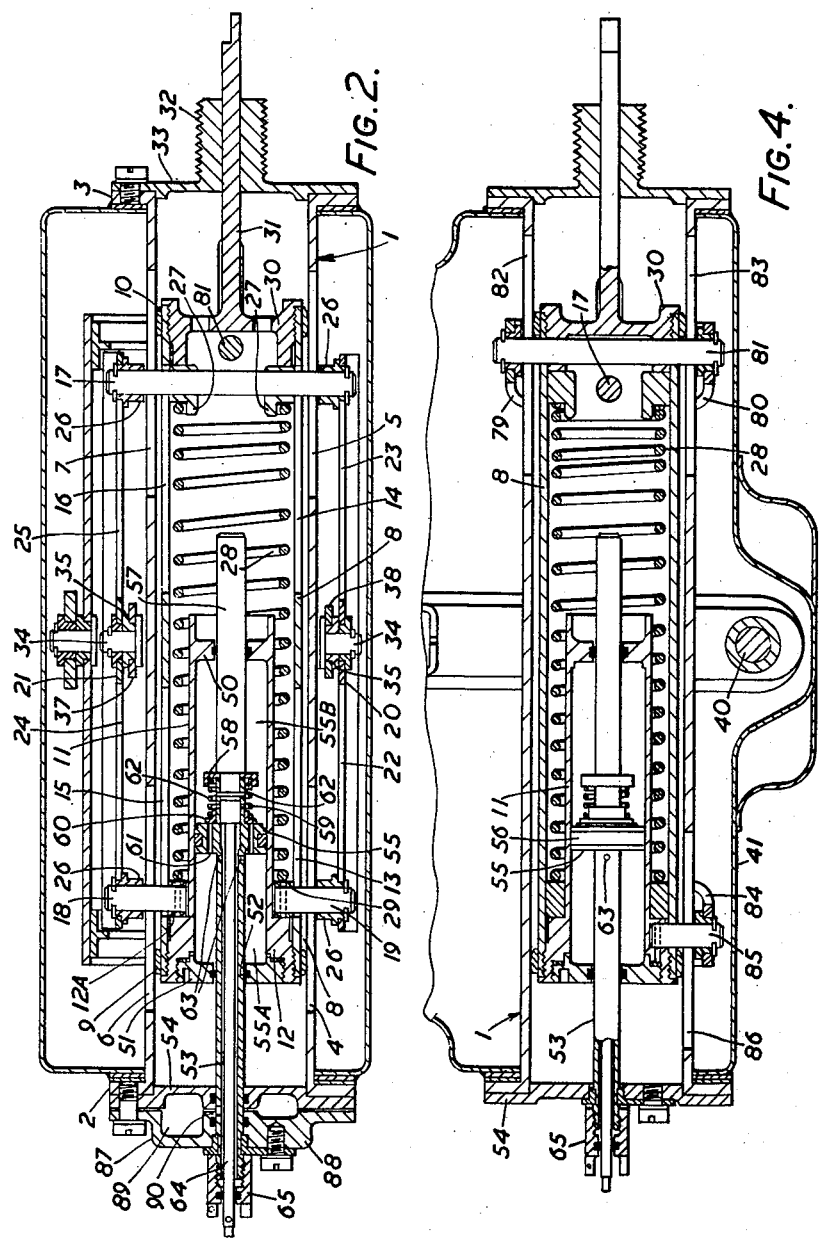
FIGURE 2 is a section taken on the line II—II of FIGURE 1.
Figure 3:
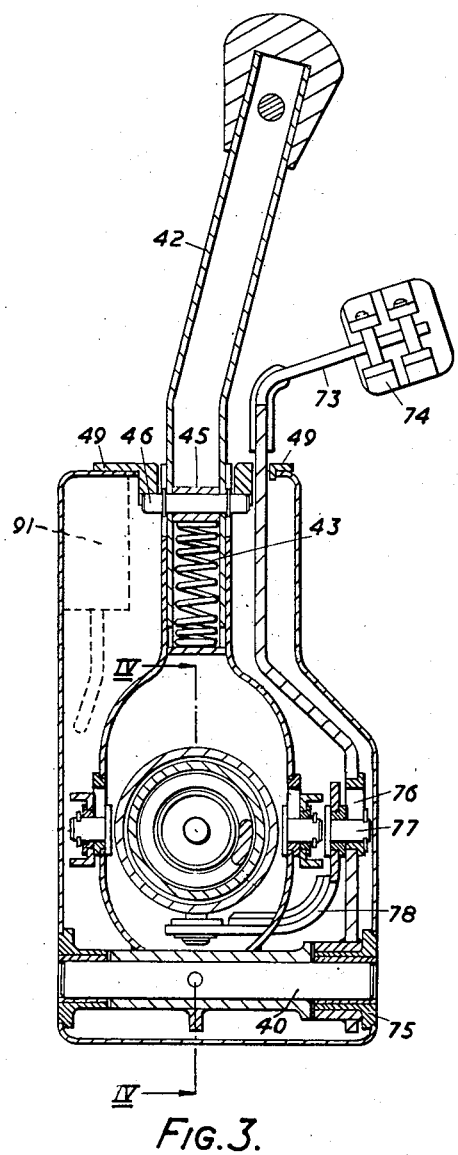
FIGURE 3 is a section taken on the line III—III of FIGURE 1.

Referring to FIGURES 1 to 4 the control device includes a steel tube 1 having outwardly directed flanges 2 and 3. Four axially directed slots 4, 5, 6 and 7 are provided in the tube 1. The slots 4, 5, 6 and 7 are of the same length and are arranged in diametrically opposite pairs 4 and 6 and 5 and 7. A cylindrical sleeve 8 is located within the tube 1, the sleeve 8 being provided with polytetrafluorethylene coated bearing surfaces 9 and 10 which are sliding fits on a polytetrafluorethylene coating (not separately shown) provided in the interior of the steel tube. A further sleeve 11 is located within the sleeve 8, the sleeve 11 having flanged part 12 at one end thereof which is secured by a screw thread connection to one end of the sleeve 8 so that the sleeve 11 extends coaxially with the sleeve 8. Four similar axially directed slots 13, 14, 15 and 16 are formed in the sleeve 8 the slots being arranged in diametrically opposite pairs 13 and 15 and 14 and 16. The slots 7, 16, 14 and 5 are engaged by a pin 17 which extends through the four slots to project, at each end thereof, outwardly of the tube 1. The slots 6 and 15 are engaged by a pin 18. One end of the pin 18 is secured to a ring 12A slidable relative to the sleeve 8 whilst the other end of the pin 18 projects outwardly of the tube 1. The slots 4 and 13 are engaged by a pin 19 having one end thereof connected to the ring 12A and the other end projecting outwardly of the tube 1.

The pins 17 and 19 are interconnected by a link 20 and the pins 17 and 18 are interconnected by a link 21. Two longitudinally directed slots 22 and 23 are formed in the link 20 while two longitudinally directed slots 24 and 25 are formed in the link 21. A bearing bushing 26 is provided on each outwardly projecting end of the pins 17, 18 and 19. The bushings 26 are sliding fits on the slots 22, 23, 24 and 25.

A ring 27 is located within the sleeve 8, the ring 27 being mounted upon the pin 17. The ring 27 serves as an abutment surface for one end of a coil spring 28 which is located within the sleeve 8. The other end of the spring 28 bears upon an abutment surface 29 which is formed by one of the annular faces of the ring 12A. It will be seen from the drawing that a substantial portion of the spring 28 lies between the sleeve 8 and the sleeve 11.

The spring 28 is under an initial pre-loading so that the ring 12A is urged into contact with the flange 12 of the sleeve 11 and the ring 27 is urged against one end cap 30 secured to the sleeve 8. The end cap 30 has an axially extending rod 31 which is a sliding fit within a boss 32 formed on a plate 33 which is secured to the outwardly directed flange 3 of the tube 1. The rod 31 and the boss 32 form a connecting arrangement for flexible cable (not shown).

Each link 20 and 21 is apertured to receive a pin 34 which engages an elongated slot 35 in a bearing member 36 formed in each arm 37 and 38 of a fork arm 39 which is pivotally mounted on a pin 40 carried by the casing 41 of the device. The manual control lever 42 is connected to the fork arm 39, the lever 42 being spring loaded with respect to the fork arm by means of a spring 43 (FIGURE 3) one end of which engages with a cross bar 44 of the fork arm 39 and the upper end of which engages a sleeve 45 provided on a pin 46 whose ends project outwardly from the lower end part of the lever 42 and protrude through the slots 47 provided in the fork arm 39. The ends of the pin 46 also engage with indexing recesses 48 provided in quadrant members 49 which are mounted in the casing 41. The spring 43 serves to maintain the pin 46 in engagement with the indexing recesses 48, the whole forming a latch mechanism.

An inwardly directed flange 50 is formed at the innermost end of the sleeve 11. A ring 51 having an external thread which engages an internal thread formed at the end of the flanged part 12 of the sleeve 11 has an inwardly directed flange 52. A hollow shaft 53 is mounted coaxially with the tube 1, one end of the shaft 53 being supported by a plate 54 which serves to close off the end of the tube 1, the plate 54 being connected to the externally directed flange 2 of the tube 1. The innermost end of the shaft 53 is provided with an annular outwardly directed flange 55 which acts as a piston within the sleeve 11. A circumferential sealing means 56 provides a fluid tight seal between the piston 55 and the sleeve 11, the rod 57 being connected in axial prolongation of the shaft 53. The rod 57 is a sliding fit in the seals provided in the flange 50. A cylindrical cup member 58 is mounted on the rod 57 the cup member 58 serving as a seating for a spring 59 which serves to push a valve member 60 against a seating formed by one of the radial annular surfaces of the piston 55. A number, e.g. fourteen, equiangularly disposed axially directed bores 61 are formed in the piston 55. The valve element 60 serves to close off the bores. Radially directed through-bores 62 and 63 are formed in the shaft 53, the bores 62 and 63 being on opposite sides of the piston 55. A rod 64 extends coaxially within the shaft 53 the innermost end of the rod 64 being secured to the shaft 53 by means of a threaded engagement located between the two sets of radial bores 62 and 63. The other end of the rod 64 projects outwardly of the end plate 54. A castellated nut 65 is provided on the outermost end of the shaft 53 the castellated nut serving as a means for locking the rod 64 with respect to the shaft 53. The thread between the rod 64 and the shaft 63 provides a fluid leakage path between the radial bores 62 and 63. It will be appreciated that by screwing the rod 64 further into (or withdrawing the rod 64 from) the shaft 53, a greater (or lesser) length of thread i.e. fluid bleed path can be obtained.

Alternatively or in addition to the flow path along the thread, a second flow path can be provided by forming axially directed slots or grooves in the rod 64 and/or shaft 63, which grooves or slots are inclined from below the thread root to the periphery of the thread.

The apparatus as so far described operates in the following manner. It will be presumed that the control lever 42 is turned in a clockwise direction as considered in relation of FIGURE 1. When the control lever 42 is moved in a clockwise direction the pivotal connection between the fork arm 39 and the links 20 and 21 will cause the links to move towards the right-hand side of FIGURE 1. The end walls of the slots 22 and 24 will engage with the pins 18 and 19 respectively and in so doing will move these pins towards the right. This motion will compress the spring 28 by an additional amount which is proportional to the extent of linear movement of the links 21 and 22. It will be appreciated that the pin 17 will not be moved relative to the tube 1 since the links 20 and 21 will move relative to the pin in view of the arrangement of the slots 23 and 25. The latch mechanism on the control lever 42 will retain and lock the lever in the required position with respect to the quadrants 49. Furthermore since the lever is locked with respect to the quadrants the links 20 and 21 are locked in an axial position relative to the tube 1 as is determined by the position of the lever 42. In other words the end of the spring 28 which bears against the abutment surface 29 is fixed with respect to the tube 1. However the other end of the spring 28 bears against the ring 27 in such manner as to move the pin 17 towards the right end of the tube 1. Since the ends of the slots 23 and 25 are, at the instant of setting the lever 42, further to the right hand end of the tube than the pin 17 the latter would tend to move to the right under the pressure exerted by the spring 28. The movement of the pin 17 will move the ring 27 attached thereto to the right and thus will move the sleeve 8 and the sleeve 11 accordingly towards the right until the spring 28 once again abuts against the annular face 29. The movement of the sleeve 11 will tend to increase the pressure in the chamber 55a of the two chambers 55a and 55b formed within the sleeve 11 by the piston 55. Since the volume of the chamber 55a decreases, the pressure in this chamber will increase and in so doing will shift the valve element 60 away from its closed position and will allow the fluid to flow from chamber 55a to chamber 55b and thereby to balance the pressure within the chambers 55a and 55b. The stored energy of the spring 59 is so selected that it offers little resistance to this flow. In other words the piston and valve arrangement afford little or no restriction to the movement of the sleeve 11 to the right with respect to the piston 55 as seen in FIGURE 1. In other words the sleeves 11 and 8 will be moved towards the right at a speed which is governed by the resistance provided between the various moving parts of the device and also the resistance of a load attached to the flexible cable connected to the elements 32 and 31.

When the manual control lever 42 is moved in a counter-clockwise direction the pin 17 is moved towards the left-hand side of FIGURE 1 by the links 20 and 21. The pins 18 and 19 remain at rest since the links 20 and 21 will move relative thereto. The movement of the pin 17 towards the left will compress the spring 28 by an additional amount which is proportional to the extent of counter-clockwise movement of the manual control lever 42. As previously explained the latch mechanism associated with the lever will lock the pin 17 with respect to the tube 1. The stored energy in the spring 28 will tend to move the pins 18 and 19 towards the left-hand end of the tube 1 and in so doing will move the sleeves 8 and 11 towards the left. The movement of the sleeve 8 will exert a pull on the flexible cable in a direction towards the left and the volume of the chamber 55b tends to decrease and the fluid pressure within the chamber correspondingly increases. The increase in fluid pressure will push and retain the valve element 60 against its seating and will prevent the egress of fluid from the chamber 55b into the chamber 55a via the bore 61. However a slow leakage of fluid takes place between the chambers 55b and 55a via the radial bores 62, the screw thread between the rod 64 and the shaft 53 (and/or the slots or grooves) and the radial bores 63. As previously mentioned the rate of flow through this by-pass connection between the chambers 55a and 55b provides a controlled leakage which governs the rate at which the spring 28 moves the sleeves 8 and 11 towards the left-hand end of the tube 1 to the position in which the spring attains its original length i.e. the pins 18 and 19 abut against the ends of the slots 22 and 24 in the links 20 and 21.

The rate at which the fluid flows through the by-pass path depends inter alia upon the length of the helical path formed by the inter-engaging threads on the shaft 53 and 64. This length will be pre-set in accordance with a desired rate of leakage, after which the rod 64 is locked relative to the shaft 53 by means of locking pins engaging the castellated nut 65 and the end of the rod. When the slots or grooves are used the rate of fluid flow will inter alia depend upon their dimensions.

In order to pre-set the desired setting of the control lever 42 relative to the quadrants 49 a manually controlled catch or gate stop 70 is provided on the quadrants. The catch includes a spring loaded member having a pin 71 which is selectively engageable with the locating recesses 48. The catch member 70 provides an abutment surface 72 which prevents further movement of the fork arm 39 in a clockwise direction.

A follow-up mechanism is provided which gives a visual indication of the position of the sleeves 8 and 11 with respect to the tube 1 at any instant during their movement relative to the tube 1. Such a follow-up mechanism enables the pilot to observe on graduated scales provided on the quadrants 49 the precise rate of travel of the sleeves 8 and 11 with respect to the tube and in consequence be given an indication of the actual position of the element whose operation is controlled by the device described above. The follow-up mechanism includes a lever 73 having a knob 74 to facilitate gripping by hand, the lever 73 being pivotally mounted on a bushing or hollow pin 75 rigidly mounted on the casing of the control device. The axis of rotation of the lever 73 is concentric with the axis of rotation of the lever 42. The lever 73 has an elongated slot 76 formed therein which is engaged by a pin 77 which is secured to a saddle plate 78 which extends lengthwise of the tube 1. One end of the saddle plate 78 is provided with two arms 79 and 80. The arm 79 passes over the top of the tube 1 and the arm 80 passes beneath the tube 1. The arms 79 and 80 are engaged by a pin 81 which engages bores formed in the sleeve 8 and the ring 30. The pin 81 also engages axially directed slots 82 and 83 formed in the tube. The slots 82 and 83 are diametrically opposite to each other and are at right angles to the slots 5 and 7. The other end of the saddle plate 68 is provided with a further arm 84 which extends beneath the tube 1 and is connected to a pin 85 which is connected to the flanged end 12 of the sleeve 11. The pin 85 passes through an axially directed slot 86 formed in the tube 1. The slot 85 is in line with the slot 83. The control lever 73 and its connection to the sleeves 8 and 11 is such that when the control lever 42 has reached its final position as determined either by the extreme possible limits of travel of the lever 42 or by the position of the gate stop 70 the two levers 42 and 73 should be in line. If the follow-up lever 73 fails to reach the end positions in line with the lever 42 this indicates that the sleeves 8 and 11 have not been moved by the additional stored energy of the spring 28 into the selected position. In other words it is indicative that the apparatus has not functioned wholly correctly in the manner intended by the pilot. By operating the lever 73 the pilot is able to pull directly the sleeves 8 and 11 into their desired position, the lever 73 thus forming a manual over-ride.

In order to provide a self-contained system in respect of the fluid in the chamber 55a and 55b a fluid reservoir 87 may be connected to the end of the tube 1. The reservoir 87 is formed by an additional dished plate 88 which is shown at the left-hand side of FIGURE 2, which is connected to the end of the tube 1. The dishing of the plate forms a cavity 89 which is in fluid connection with the interior of the shaft 53 via a radially directed bore 90 formed in the shaft 53. If desired the chamber 89 can be connected with a fluid reservoir 91 which is shown in dotted lines in FIGURE 3. The reservoir 91 is connected to the chamber 89 via a conduit 92 also shown in dotted lines which leads to the interior of the chamber 89 via a suitable nipple (not shown) provided on the plate 88.

Figure 6:
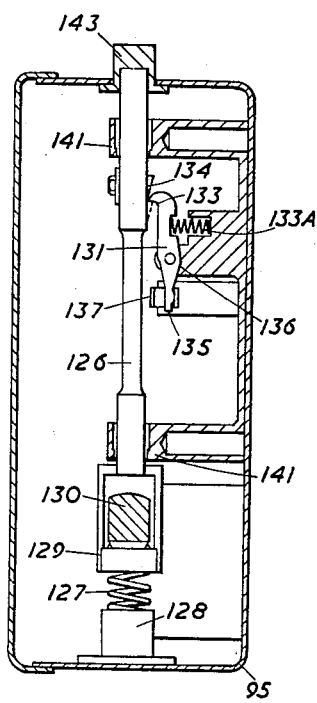
FIGURE 6 is a section on the line VI—VI of FIGURE 5.
Figure 7:
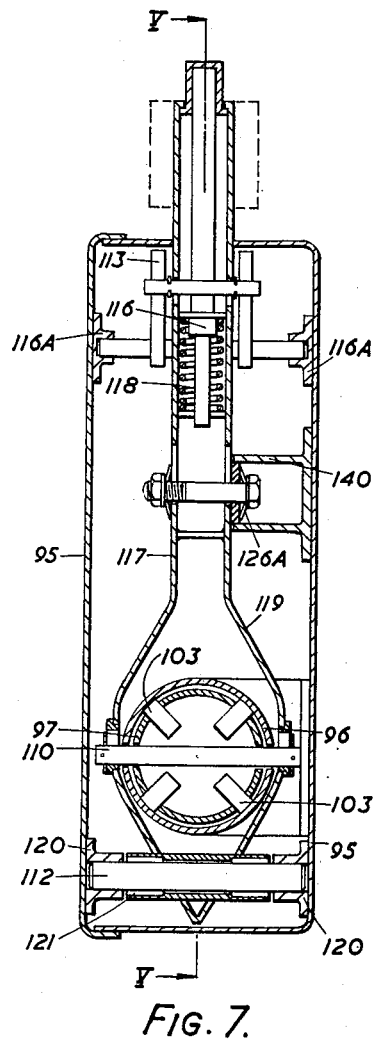
FIGURE 7 is a section on the line VII—VII of FIGURE 5.

Referring to FIGURES 6 and 7 which illustrate a second embodiment of the control unit. The control unit consists of a bi-partite housing 95 within which is mounted a sleeve 96. The sleeve 96 is rigidly mounted in the casing 95. A sleeve 97 is provided within the sleeve 96, the sleeve 97 extending substantially the whole length of the sleeve 96 and being coaxially aligned therewith. The sleeve 97 is provided at each end, in order to facilitate the slidability of the second sleeve with respect to the first sleeve, with a polytetrafluorethylene or nylon bearing member 98. One end 99 of the sleeve 97 is closed by an end plate 100 which is adapted for connection to an operating cable or linkage (not shown). In the case of a flexible cable type or linkage which has an outer casing and a movable inner element, the inner element is connected to the sleeve 97 and the outer element is connected to the corresponding outer sleeve 96. The sleeve 97 is effectively divided into two sections 101, 102 by inwardly directed stops 103. A first circular plate 104 is slidably mounted within the sections 102 of the sleeve 97 the plate 104 being located between the stops 103 and said end plate 100 attached to said one end of the second sleeve. A first coiled pre-loaded spring 105 is located within the section 102 of the sleeve 97, one end of the spring bearing against the circular plate 104 and the other end of the spring bearing against said end plate 100. A second circular plate 106 is provided within the sleeve 97, this plate 106 being located within the section 101. One end of a second pre-loaded coil spring 107 located within the sleeve section 101 bears upon the second circular plate 106. The other end of the second spring bears against a further end plate 108 which is attached to the other end of the sleeve 97. The walls of the two sleeves 96, 97 are slotted by diametrically opposite slots 109 located in the vicinity of the stops 103, the slots extending substantially to equal distances to either side of the stops 103. A pin 110 slidably engages the slots 109 thus formed, the pin being carried by a control lever 111 which is pivotally mounted by a pivot 112 on the casing 95. The arrangement of the pin 110 and the mounting of the control lever 111 is such that when the control lever 111 is rotated about its pivot 112 one or other of the springs 104, 107 within the sleeve 97 is further compressed by reason of the pin pushing on the plate 104 or on the plate 106. The upper end of the control lever 111 co-operates with a graduated scale 113 and in addition is provided with a catch mechanism in the form of a pin 114, which engages with indexing recesses 115 provided on the scale 113 whereby the control lever 111 can be pre-set at predetermined angular positions along the scale 113. To facilitate the operating movement of the control lever 111 the upper part 116 is resiliently loaded relative to the lower part 117 of the lever by a spring 118. The spring 118 is such that the lever 111 can only be moved by depressing of the upper part 116 relative to the lower part 117 to disengage the catch pins 114 from the recess 115. The lower part of the control lever 111 is constituted by two parallel arms 119 which are connected to each end of the pin 111 which engages the slots 109, and also to the pivot pin 112. The pin 112 which is mounted in bearing members 120 carries a spacing member 121 which facilitates the mounting of lever 111.

An elongated slot 122 is formed in the intermediate section of the control lever the slot extending longitudinally of the control lever 111. A further pin 123 engages the slot 122 in the control lever. Both ends of the further pin 123 project outwardly of the control lever, the ends engaging in an elongated slot 124 formed in a locking arm 125. Disc spring friction washers 126A allow the desired relative slideable movement of the arms 111 and 125 within the casing. The locking arm 125 is slidable in a direction which is axially aligned with the axes of the sleeves 96 and 97. The amount of movement of the locking arm is limited by the length of the slot 122. One end of the locking arm 125 co-operates with a slidable rod member 126 which slides in guides 141 along a direction which is perpendicular to the axis of the sleeves 96 and 97. Suitable guides 140 are provided within the casing for the locking arm 125. The rod member 126 is spring loaded by a spring 127 interposed between the lower end of the rod member 126 and a seating element 128 provided within the casing. The lowermost end of the rod member 126 carries toothed portions 129 which co-operate with a rack 130 which is connected to the end plate 108 which is secured to said other end of the sleeve 97. The spring loading of the rod member 126 is such that the toothed portions 129 engage with the rack 130.

The upper end of the locking arm 126 co-operates with a spring loaded catch lever 131 which is pivotally mounted at 132 within the casing 95 intermediate of its ends. One end of the lever 131 carries a hook part 132 which is engageable with a latching surface 134 provided on the rod 126. The other end 135 of the catch lever 131 co-operates with a cam surface 136 provided in a slot 139 in the free end of the rod 125.

The above described apparatus operates as follows: In order to move the control lever 111 the spring loaded portion 116 is depressed to release the catch mechanism, and the control lever 111 is moved relative to the quadrant 113 on the casing 95. As the control lever 111 is pivoted the friction between the disc springs 126A on the further pin 123 is sufficiently high to cause the locking arm 125 to execute a longitudinal movement which will cause the catch lever 131 to release the vertical rod 126 and to allow the latter to engage itself with the toothed rack 129 provided on the end plate 108, thereby locking the position of the second sleeve 97 with respect to the first sleeve 96. After the further pin 123 has moved to one end of the slot in the control lever 111 (the end depending upon the direction of rotation of the lever) the further pin 123 will be caused to slide along the slot 124 in the locking arm 125. This rotation of the control lever 111 further compresses the compression spring 105 or 107 depending upon whether the first or second circular plate 104 or 106 is being pushed by the pin 110 engaging the slots 109 in the sleeves 96 and 97. At the end of the desired movement of the control lever 111, the compressed spring will be compressed by an additional amount which is directly proportional to the amount of movement of the control lever.

When it is desired to operate the control unit the vertical rod 126 is depressed by means of a suitable push button 143 which co-operates with the upper end of the vertical rod 126 to allow the teeth 129 on the rod to disengage from the rack 130 connected to the second sleeve 97. The downward movement of the rod 126 also causes the catch lever 131 associated with the locking arm 125 to re-engage with the latching surface 134 to hold the vertical rod 126 in the depressed position. As soon as the inner sleeve 97 has become disengaged the stored energy of the compressed spring 104 or 106 will move the inner sleeve 97 with respect to the outer sleeve 96 by an amount which is proportional to the additional amount by which the spring was originally compressed by a movement of the control lever. The second sleeve comes to rest when the equilibrium position is reached, i.e. the position in which the first pin 110 engages with the slots 107 and stops the spring pre-load ensuring that full operating force is available to move the inner sleeve right up to the selection position.

The rate at which the stored energy of the spring dissipates itself by moving the inner sleeve 97 is conveniently controlled by the hydraulic throttling arrangement (not shown) associated with the apparatus (not shown) being controlled by the above-described unit. To facilitate the setting of the rate at which the dissipation takes place a further manually controlled lever (not shown) is provided on the above described unit this latter mentioned lever being connected by a suitable linkage on the apparatus. A manual override and positional indicator lever (not shown) is provided, the latter acting directly on the side of the inner sleeve overriding the spring system. While the system is acting normally this gives an indication that the position of the inner sleeve and hence the position that the member controlling the nozzle movement has attained at any one time.

Instead of using a control lever construction, such as has been described in relation to both embodiments (which involves a longitudinal depression of the lever to disengage indexing pairs from the notches), the lever can be formed in two sections which are pivotally connected together. The upper section which is in practice gripped by the hand is spring loaded into a rest position in which an indexing pin normally engages an indexing notch. When it is desired to move the lever the upper part is tilted about its pivot against the spring loading, automatically to disengage the indexing pin from the notch.

What we claim is:

1. A pilot's cockpit control unit comprising a housing, a cylindrical sleeve located within the housing, and capable of axial movement relative thereto, the sleeve being adapted for connection to a unit which is to be actuated from the cockpit, pre-stressed resilient means within the sleeve; a manually operable control lever pivoted to the housing for operational pivotal movement relative to the housing to either side of a reference position a force transmitting connection interconnecting the control lever and the resilient means whereby, depending upon the direction of lever movement from said reference position, the resilient means can be further stressed in a required sense without displacing the sleeve relative to the housing so as to impose a force on the sleeve which moves the sleeve in a direction which progressively dissipates the additional stressing, and means operatively co-operating with the sleeve for retarding the rate at which the sleeve is moved relative to the housing by the resilient means in order to dissipate the increased pre-stressing of the resilient means.

2. A pilot's cockpit control unit, comprising a housing; a slide element longitudinally movable within the housing, the slide element being adapted for connection to a unit to be actuated; a pre-stressed resilient means carried by the slide element, a manually actuatable control lever connected with the housing for operational movement to either side of a reference position, a force transmitting connection interconnecting the control lever and the resilient means whereby, depending upon the direction of lever actuation from said reference position, the resilient means can be further stressed in a required sense without displacing the slide element relative to the housing so as to impose a force upon the slide element to move the latter in a direction which allows the additional stressing of the resilient means operatively co-operating with the slide element to be progressively dissipated, and means for retarding the rate at which the slide element is moved in said direction by the resilient means.

3. An aircraft pilot's cockpit control unit, comprising a housing; a slide element longitudinally movable within the housing and adapted for connection to a unit to be actuated from the cockpit; a pre-stressed resilient means carried by the slide element; a manually actuatable control lever connected with the housing for operational movement to either side of a reference position, a force transmitting connection interconnecting the control lever and the resilient means whereby, depending upon the direction of lever actuation from said reference position, the resilient means can be additionally stressed in a required sense so as to impose a force upon the slide element to move the latter in that direction which allows the additional stressing of the resilient means to be progressively diminished; and hydraulic means operatively co-operating with the slide element for retarding the rate at which the slide element is moved in said direction, the hydraulic means including a valve controlled device operatively co-operating therewith for building up a hydraulic pressure which is proportional to the stress increase of the resilient means and pressure leakage means for permitting a controlled progressive fall in said hydraulic pressure.

4. A pilot's cockpit control unit, comprising a housing, a slide element longitudinally movable within the housing and adapted for connection to a jet unit to be actuated from the cockpit; a prestressed resilient means carried by the slide element, a manually actuatable control lever connected with the housing for operational movement to either side of a reference position; a force transmitting connection interconnecting the control lever and the resilient means whereby, depending upon the direction of lever actuation from said reference position the resilient means can be additionally stressed in a required sense so as to impose a force upon the slide element in that direction which allows the additional stressing of the resilient means operatively co-operating with the slide element to be progressively dissipated; and hydraulic means for retarding the rate at which the slide element is moved relative to the housing in order to dissipate the pre-stressing of the resilient means, the hydraulic means including a piston and a cylinder operatively cooperating therewith and which are relatively movable with respect to each other, said cylinder extending axially of the slide element and fixed thereto, the piston being carried upon a hollow shaft extending coaxially of the cylinder, one end of the shaft being connected with said housing, a one way valve which permits a flow of hydraulic fluid from one side of the piston to the other, and means for permitting a controlled leakage flow of the hydraulic fluid from said other piston side to the one side of the piston.

5. A pilot's cockpit control unit for controlling the operation of a control unit of the aircraft comprising a housing; a slide element longitudinally movable within the housing and adapted for driving connection to said control unit; a pre-stressed resilient means carried by the slide element; a manually actuatable control lever connected with the housing for operational movement to either side of a reference position; a force transmitting connection interconnecting the control lever and the resilient means whereby, depending upon the direction of lever actuation from said reference position the resilient means can be further stressed in a required sense so that the slide element can be displaced relative to the housing in the direction which progressively dissipates the further stressing; a hydraulic device operatively co-operating with the slide element and including a piston and cylinder operatively co-operable therewith and which are relatively movable with respect to each other said cylinder extending axially of the slide element and attached thereto, a hollow shaft extending axially of the cylinder, one end of the shaft being connected with said housing, the piston being carried by the shaft, a rod extending coaxially within the shaft, one end of the rod being secured to the shaft by means of a threaded engagement located at said piston, a radially directed bore in the shaft at each side of the piston thereby to provide a fluid leakage path via the threaded engagement which allows any hydraulic pressure increase caused by relative movement between the cylinder and piston to be progressively decreased and thus allow the slide element to move relative to the housing.

6. A pilot's cockpit control unit for controlling the actuation of a controlled unit, comprising a housing, a slide element longitudinally movable within the housing; and adapted for connection to the controlled unit, a pre-stressed resilient means carried by the slide element; a manually actuatable control lever connected with the housing for operational movement to either side of a reference position, a force transmitting connection interconnecting the control lever and the resilient means whereby, depending upon the direction of lever actuation from said reference position the resilient means can be further stressed in a required sense so as to impose a force upon the slide element which moves the latter in that direction which allows the additional stressing of the resilient means to be dissipated, means operatively co-operating with the slide element for retarding the rate at which the slide element is moved by the resilient means in said direction; and a follow-up mechanism which is linked with the slide element so as to provide a visual indication of the position of the slide element within the housing.

7. A control unit as claimed in claim 6, in which the follow-up mechanism comprises a second manually actuatable lever connected to the housing; a connection between the second manually operable lever and the slide element whereby said second lever is automatically moved in consequence of movement of the slide element.

8. In an aircraft with a tiltable power jet unit a pilot's cockpit control unit for controlling the positional adjustment of the jet unit, comprising a housing, a cylindrical sleeve axially movable within the housing and adapted for connection to the jet unit; a pre-stressed resilient means located within the sleeve; first and second means each located in the sleeve in such manner as to be relatively movable thereto, and engaging with the resilient means, a manually actuatable control lever connected with the housing for operational movement to either side of a reference position; a force transmitting connection interconnecting the control lever and each of said first and second means whereby, depending upon the direction of lever actuation from said reference position, either one of the first and second means can be displaced relative to the sleeve so as further to increase the stressing of the resilient means in a required sense without displacing the sleeve in the housing so that a force is imposed upon the sleeve which moves the latter in that direction which dissipates the increase in stress; and hydraulic means operatively co-operating with the sleeve for retarding the rate at which the sleeve is moved by the resilient means relative to the housing in said direction, the hydraulic means including a valve controlled device operatively co-operating therewith for building up a hydraulic pressure which is proportional to the increase in the stored energy of the resilient means and means defining a fluid leakage path which permits a controlled progressive fall in said hydraulic pressure to allow a corresponding sleeve movement.

9. For an aircraft with tiltable power jet unit a pilot's cockpit control unit for controlling the positional adjustment of the power unit, comprising a housing; a cylindrical sleeve longitudinally movable within the housing, the sleeve being adapted for connection to the power unit, a pre-stressed spring located within the sleeve, first and second pressure means engaging with opposite ends of the spring respectively a manually actuatable control lever connected with the housing for operational movement to either side of a reference position; a force transmitting connection interconnecting the control lever and each of said first and second pressure means whereby, depending upon the direction of lever actuation from said reference position, either one of the first and second means can be displaced relative to the sleeve so as further to compress the spring without displacing the sleeve relative to the housing, so that the sleeve is urged to move in a required direction relative to the housing; and hydraulic means operatively co-operating with the sleeve for retarding the rate at which the sleeve is moved relative to the housing in said direction in order to dissipate the further compression of the spring, the hydraulic means including a cylinder and a piston operatively co-operating therewith which piston and cylinder are relatively movable with respect to each other, said cylinder extending coaxially within the sleeve and being fixed thereto, with the piston carried upon a hollow shaft extending axially of the sleeve, one end of the shaft being connected with said housing, a rod extending coaxially within the shaft, the innermost end of the rod being secured to the shaft by means of a threaded engagement located at said piston and a radially directed bore in the shaft on each side of the piston thereby to provide a fluid leakage path via the threaded engagement in the opposite direction to said direction which allows any hydraulic pressure increase caused by relative movement between the cylinder and the piston to be progressively decreased and thus allow the slide element to move relative to the housing.

10. A pilot's cockpit control unit for controlling the positional adjustment of a controlled unit, comprising a housing, a cylindrical sleeve longitudinally movable within the housing, first and second pre-stressed compression springs arranged end to end in the sleeve, first and second pusher means each located within the sleeve in such manner as to be relatively movable thereto and respectively engaging with the adjacent ends of the springs; a manually actuatable control lever connected with the housing for operational movement to either side of a reference position, a force transmitting connection interconnecting the control lever and each of said first and second pusher means whereby depending upon the direction of lever actuation from said rest position either one of the first and second pusher means can be displaced relative to the slide element to push against its associated spring so as further to increase the stressing of this associated spring without displacing the sleeve relative to the housing, and means operatively co-operating with the sleeve for retarding the rate at which the sleeve is moved by the further compressed spring in the direction which allows the increase of stored energy in this spring to be dissipated.

References Cited in the file of this patent

UNITED STATES PATENTS

| | | |
|---|---|---|
| 1,569,672 | Peabody et al. | Jan. 12, 1926 |
| 2,312,424 | Lentz | Mar. 2, 1943 |
| 2,922,400 | Lorence | Jan. 26, 1960 |
| 2,930,249 | London et al. | Mar. 29, 1960 |
| 2,940,330 | Parsons | June 14, 1960 |